(12) United States Patent
Zitzmann et al.

(10) Patent No.: US 10,837,842 B2
(45) Date of Patent: Nov. 17, 2020

(54) SUBSTRATE FOR A SENSOR ASSEMBLY FOR A RESISTANCE THERMOMETER, SENSOR ASSEMBLY, RESISTANCE THERMOMETER AND METHOD OF PRODUCING SUCH A SUBSTRATE

(71) Applicant: TE Connectivity Sensors Germany GmbH, Dortmund (DE)

(72) Inventors: Heinrich Zitzmann, Lauf a.d. Pegnitz (DE); Horst Sirtl, Lauf a.d. Pegnitz (DE); Dirk Nusse, Dortmund (DE)

(73) Assignee: TE CONNECTIVITY SENSORS GERMANY GMBH, Dortmund (DE)

( * ) Notice: Subject to any disclaimer, the term of this patent is extended or adjusted under 35 U.S.C. 154(b) by 398 days.

(21) Appl. No.: 15/366,270

(22) Filed: Dec. 1, 2016

(65) Prior Publication Data

US 2017/0153150 A1 Jun. 1, 2017

(30) Foreign Application Priority Data

Dec. 1, 2015 (DE) .......................... 10 2015 223 948

(51) Int. Cl.
*G01K 7/00* (2006.01)
*G01K 7/18* (2006.01)
*G01K 7/16* (2006.01)
*G01K 1/14* (2006.01)

(52) U.S. Cl.
CPC ................ *G01K 7/18* (2013.01); *G01K 1/14* (2013.01); *G01K 7/16* (2013.01)

(58) Field of Classification Search
CPC combination set(s) only.
See application file for complete search history.

(56) References Cited

U.S. PATENT DOCUMENTS

| 5,831,512 A * | 11/1998 | Wienand | G01K 7/183 338/25 |
| 5,846,891 A * | 12/1998 | Son | C04B 35/117 501/127 |
| 5,846,897 A * | 12/1998 | Blank | B01J 31/2234 502/150 |
| 2004/0040843 A1* | 3/2004 | Weyl | G01N 27/4077 204/424 |
| 2007/0110124 A1* | 5/2007 | Shiraki | G01K 1/08 374/208 |
| 2009/0122506 A1* | 5/2009 | Sugimoto | B32B 18/00 361/811 |
| 2011/0280279 A1* | 11/2011 | Gregory | F01D 17/085 374/152 |
| 2012/0079900 A1* | 4/2012 | DeWyse | G01N 33/20 73/866 |

(Continued)

FOREIGN PATENT DOCUMENTS

DE 4300084 A1 7/1994

OTHER PUBLICATIONS

EPO translation of DE4300084.*

(Continued)

*Primary Examiner* — Stephen D Meier
*Assistant Examiner* — Nasir U. Ahmed

(57) ABSTRACT

A substrate for a sensor assembly of a resistance thermometer is disclosed. The substrate is comprised of spinel and magnesium oxide and has a thermal coefficient of expansion approximately equal to the thermal coefficient of expansion of platinum.

22 Claims, 5 Drawing Sheets

(56) References Cited

U.S. PATENT DOCUMENTS

2012/0091856 A1\* 4/2012 Tsuji .................... C04B 35/443
310/313 R

OTHER PUBLICATIONS

EP translation of WO2010118813.\*
German Office Action, dated Aug. 3, 2016, 5 pages.
Abstract of DE4300084, dated Jul. 7, 1994, 1 page.

\* cited by examiner

SUBSTRATE FOR A SENSOR ASSEMBLY FOR A RESISTANCE THERMOMETER, SENSOR ASSEMBLY, RESISTANCE THERMOMETER AND METHOD OF PRODUCING SUCH A SUBSTRATE

CROSS-REFERENCE TO RELATED APPLICATIONS

This application claims the benefit of the filing date under 35 U.S.C. § 119(a)-(d) of German Patent Application No. 102015223948.9, filed on Dec. 1, 2015.

FIELD OF THE INVENTION

The present invention relates to a sensor assembly, and more particularly, to a substrate for a sensor assembly of a resistance thermometer.

BACKGROUND

Resistance thermometers known in the art have a measuring structure made of platinum, which is arranged on a substrate. The substrate and the measuring structure in known resistance thermometers have different thermal coefficients of expansion. When known resistance thermometers are stressed by abrupt changes in temperature, alterations and damage, which act on the entire measuring structure and falsify the measurement values as a result, can occur at the boundary layer between the substrate and the measuring structure. Consequently, a temperature measurement made by the resistance thermometer becomes more unreliable over time.

SUMMARY

An object of the invention, among others, is to provide a substrate for a sensor assembly of a resistance thermometer which does not suffer alterations or damage at a boundary layer and provides stable measurements in the long term. The disclosed substrate is comprised of spinel and magnesium oxide and has a thermal coefficient of expansion approximately equal to the thermal coefficient of expansion of platinum.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
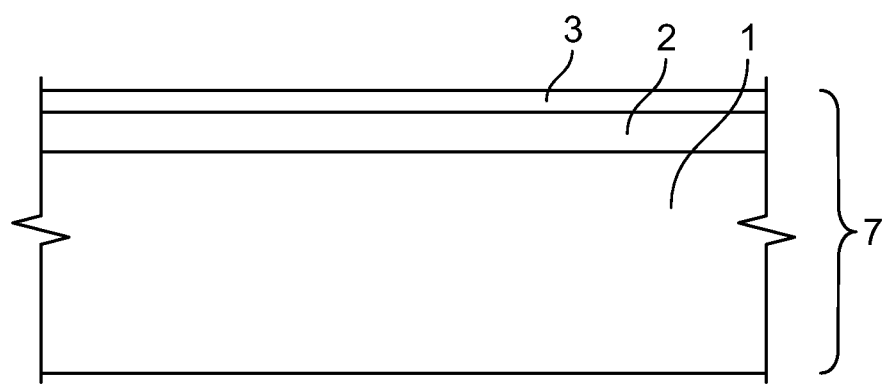
FIG. 1 is a sectional view of a sensor assembly according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

A sensor assembly 7 for a resistance thermometer according to the invention is shown generally in FIG. 1. The sensor assembly 7 comprises a substrate 1 on which there is arranged a measuring structure 2 made of platinum. The measuring structure 2 is in turn covered by a cover layer 3.

The substrate 1 serves as a support for the measuring structure 2, which can be very fragile. The measuring structure 2, in an embodiment of the invention, is a meandering structure. The resistance of the measuring structure 2 changes depending on the temperature. This change in resistance can be measured and the temperature can be deduced from this.

The substrate 1 has a thermal coefficient of expansion approximately equal to the thermal coefficient of expansion of platinum, in other words, the thermal coefficient of expansion of the substrate 1 deviates by a maximum of approximately 10% from the thermal coefficient of expansion of platinum. In other embodiments, an even lower deviation of 5%, 3%, 2% or less can be selected. The thermal coefficients of expansion of the substrate 1 and of the platinum measuring structure 2 are adapted to one another and can in particular deviate from one another within the specified ranges only in a region relevant for measuring, for example in a region in which the sensor assembly 7 is operated later, for instance from −50° C. to 1000° C. They may deviate further from one another outside such a region.

Figure 2:
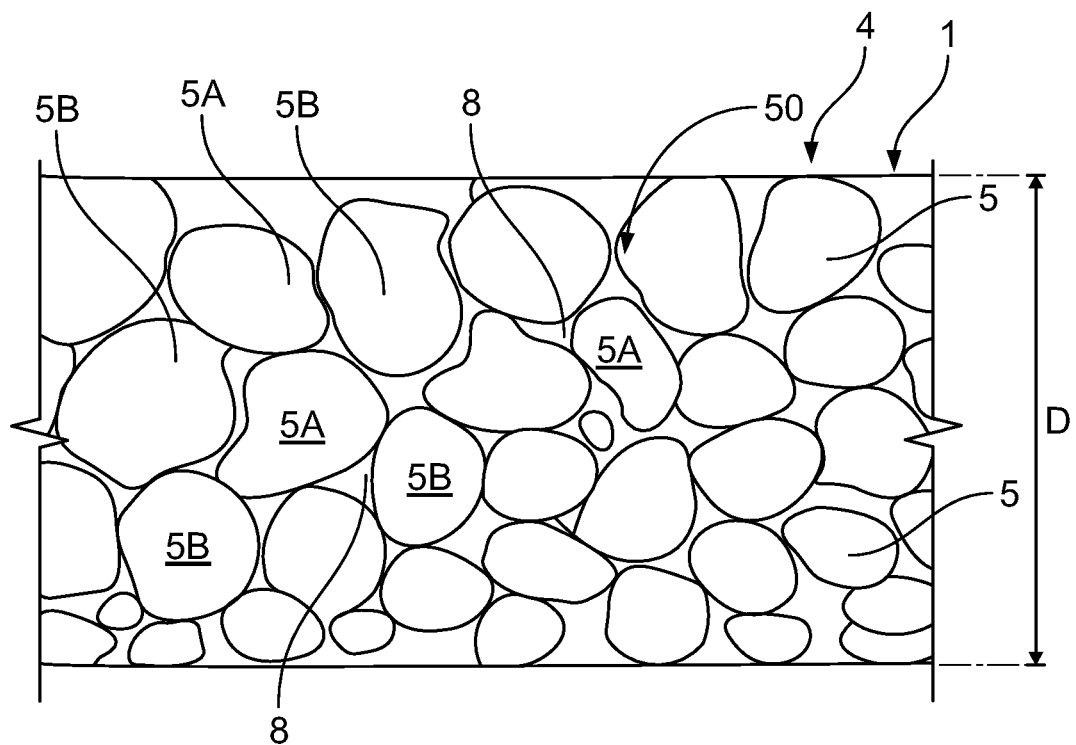
FIG. 2 is a sectional view of a layer of a substrate of the sensor assembly.

The substrate 1, as shown in FIG. 2, has a grain structure 50 in which a mixture of spinel grains 5A and magnesium oxide grains 5B are present. The substrate 1 comprises only a single layer 4 here. Gaps 8 are present between the grains 5, 5A, 5B. The substrate 1 is produced by mixing spinel grains 5A and magnesium oxide grains 5B in powder form. A solvent, which is evaporated by heating in a subsequent step, for example, may have been used to mix the powder spinel grains 5A and the magnesium oxide grains 5B prior to evaporation. In order to come as close as possible to the thermal coefficient of expansion of platinum, the proportion of spinel to magnesium oxide should be around 1:1 by volume of powder. In an embodiment in which the substrate 1 consists only of these two components, there is therefore around 50% spinel and 50% magnesium oxide.

Figure 3:
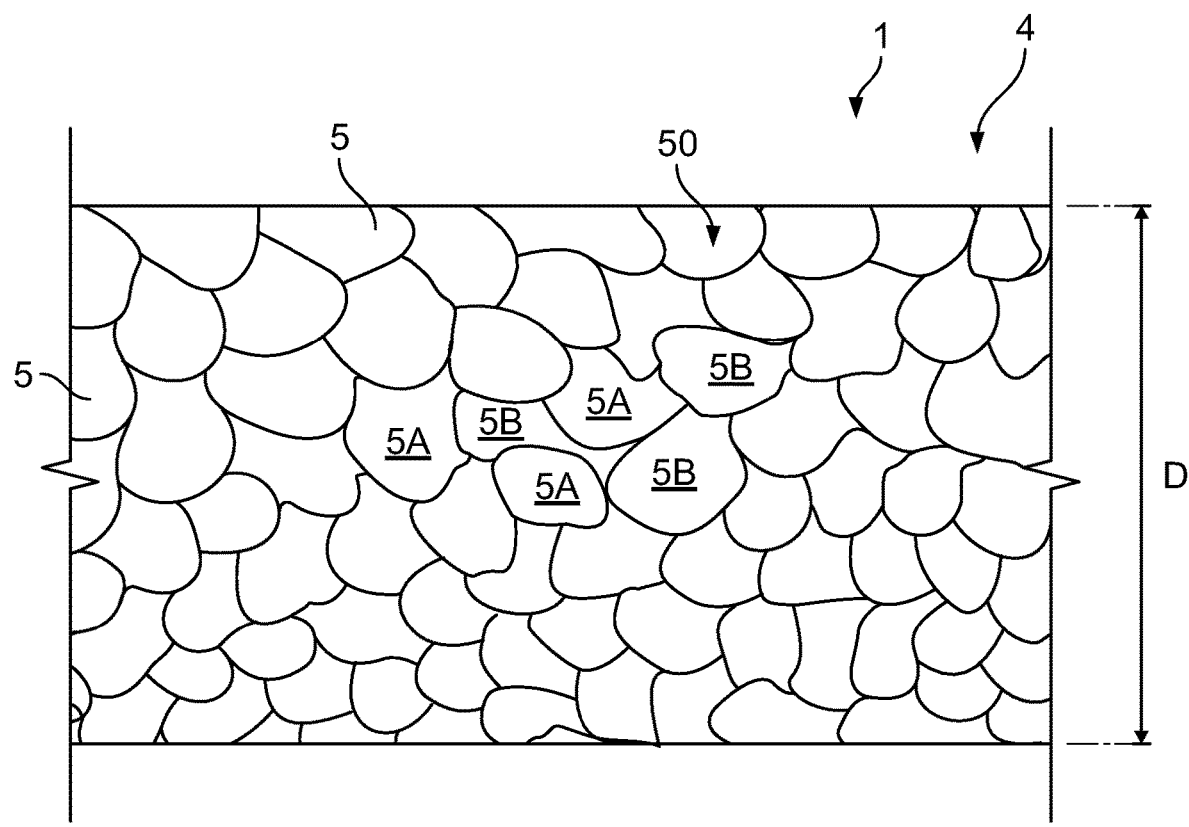
FIG. 3 is a sectional view of another layer of the substrate.

A substrate 1 according to another embodiment is shown in FIG. 3. In the substrate 1 of FIG. 3, no gaps are present. The grains 5, 5A, 5B are situated close to one another and the substrate 1 is particularly compact as a result. Such a configuration can be achieved by compacting the mixture of grains 5, 5A, 5B or partially fusing the grains 5, 5A, 5B.

In order to keep the surface of the substrate 1 sufficiently smooth, the grains 5 should not be too large. On the other hand the production of fine powders is complex. In an embodiment, grains 5 between approximately 0.5 μm and 10 μm are used.

In order to protect the sensor assembly 7, in an embodiment, the cover layer 3 can be completely or partially disposed over the sensor assembly 7. This cover layer 3 can be constructed in layers.

Figure 4:
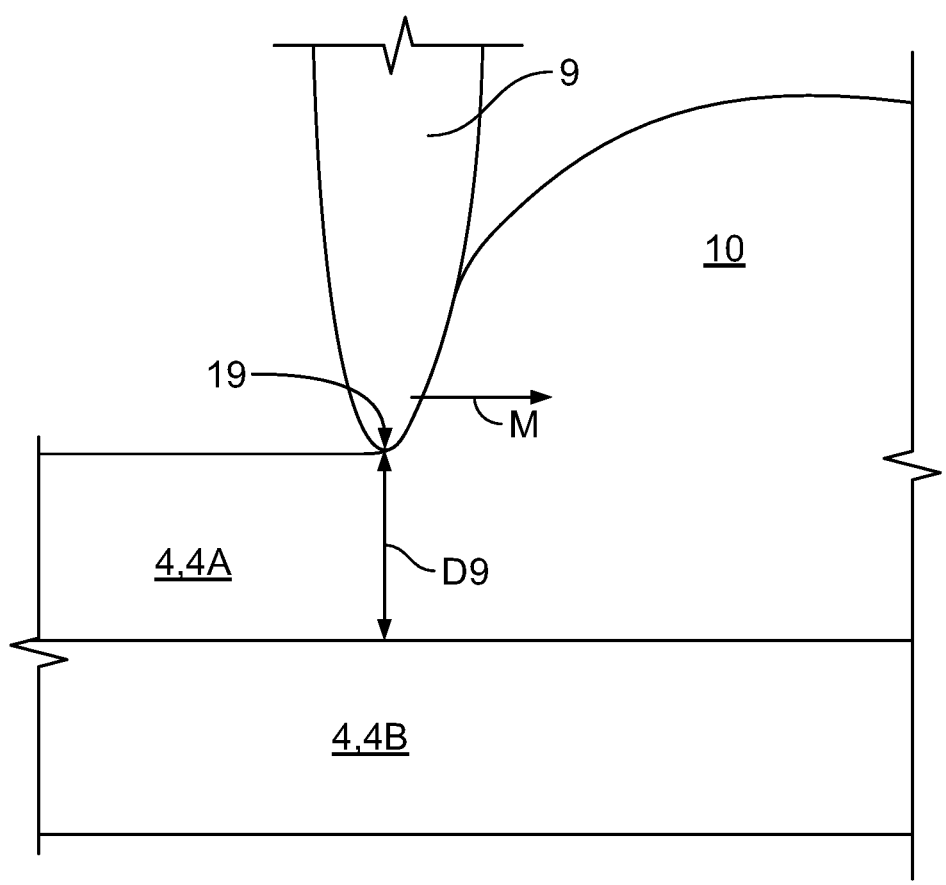
FIG. 4 is a schematic of a method of producing the substrate.

A method of producing a substrate 1 is shown in FIG. 4. In the method of FIG. 4, an upper layer 4A is deposited onto an already present lower layer 4B. The upper layer 4A is produced by applying a paste 10 with a tool 9. The tool 9 moves along a direction of movement M with a tip 19 of the tool 9 at a suitable spacing D9 over the lower layer 4B. The upper layer 4A created as a result can be stabilized easily, for example, by heating. Additional layers 4 may then be deposited. In other embodiments of the method, the powder or the paste can be put into a mold out of which the substrate 1 is removed after a hardening step.

Figure 5:
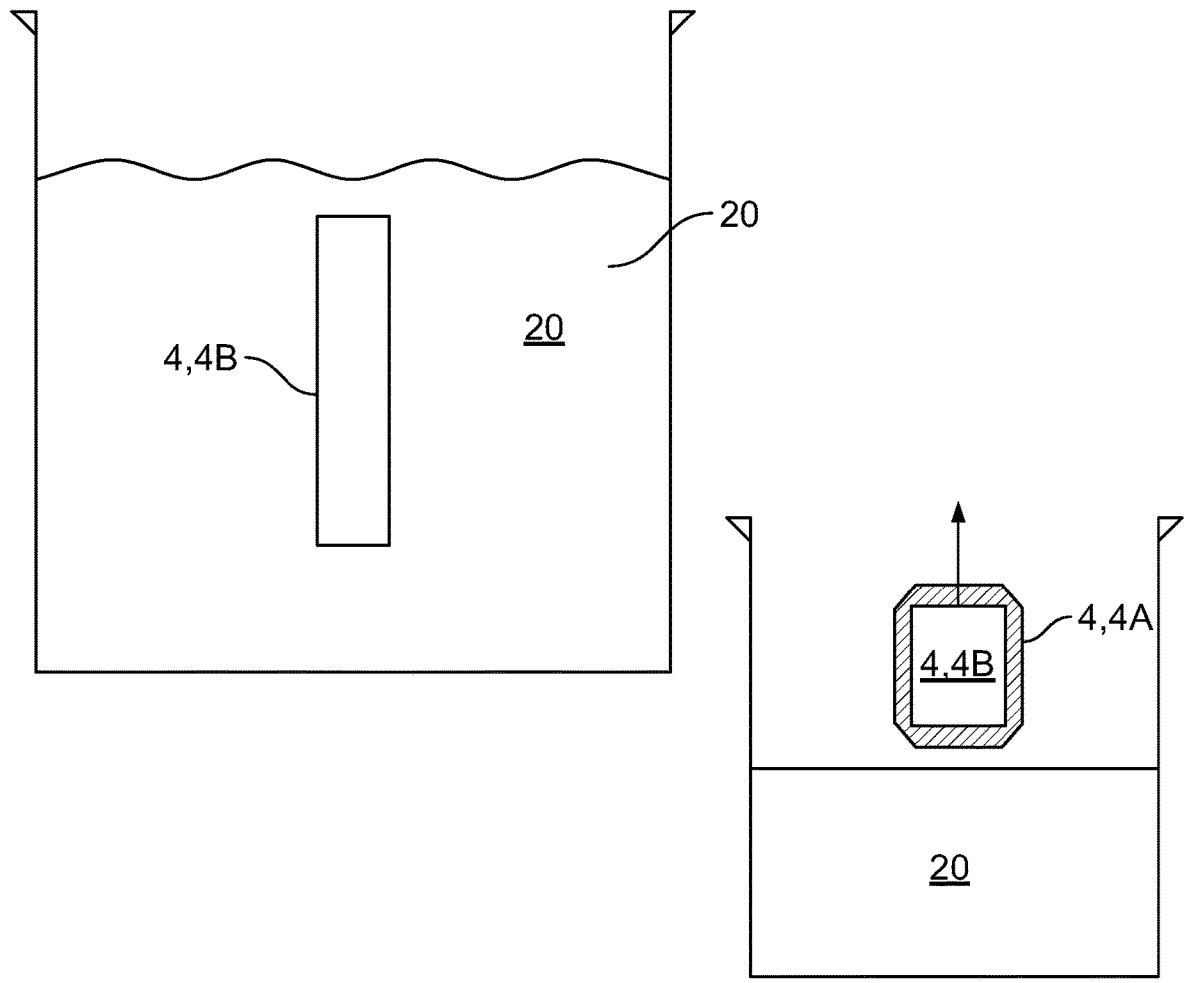
FIG. 5 is a schematic of another method of producing the substrate.

A method of producing a substrate 1 according to another embodiment is shown in FIG. 5. In this case, upper layers 4A are deposited on an already present lower layer 4B through a dipping process in a suspension 20 or in a molecular solution. The substrate 1 is moved out of the solution at a uniform speed. The upper layers 4A created as a result can be stabilized easily by heating. Additional layers 4 may then be deposited, or these layers 4 may already form the substrate 1 required for the platinum measuring structure.

Advantageously, in the substrate 1 of the sensor assembly 7 for a resistance thermometer according to the invention, the substrate 1 has a thermal coefficient of expansion which is adapted to correspond to the thermal coefficient of expansion of the platinum measuring structure 2, avoiding damage or tears due to different thermal coefficients of expansion. If an attempt were made to adapt the substrate 1, with regard to its thermal coefficient of expansion, to the platinum by mixing magnesium oxide powder and aluminum oxide powder, for example, in a ratio which mathematically leads to a coefficient of expansion which corresponds to that of the platinum, then this would not be successful because the magnesium oxide and the aluminum oxide react with one another at the boundary layers of the powder grains and the coefficient of expansion of this mixture deviates from the coefficient of expansion to be expected. In order to reach a desired thermal coefficient of expansion, complex series of experiments consequently have to be carried out in order to find a suitable mixture. In contrast to the case with a combination of magnesium oxide and aluminum oxide, there occur in the case of a combination of spinel and magnesium oxide no reactions which alter the properties, in particular the thermal coefficients of expansion. The substrate 1 formed of spinel and magnesium oxide can thus be produced in which the thermal coefficient of expansion is adapted to that of the platinum without carrying out a complex series of experiments.

What is claimed is:

1. A substrate for a sensor assembly of a resistance thermometer, consisting essentially of:
   spinel and magnesium oxide, and having a thermal coefficient of expansion is within 10% of thermal coefficient of expansion of platinum.

2. The substrate of claim 1, further comprising a grain structure with a mixture of spinel grains and magnesium oxide grains.

3. The substrate of claim 2, wherein the spinel grains and magnesium oxide grains are in a powder form.

4. The substrate of claim 3, wherein a volume of a spinel powder is approximately equal to a volume of a magnesium oxide powder.

5. The substrate of claim 2, wherein a size of each grain of the mixture of spinel grains and magnesium oxide grains is between approximately 0.5 µm and 10 µm.

6. The substrate of claim 2, wherein gaps are present among the mixture of spinel grains and magnesium oxide grains.

7. The substrate of claim 2, wherein grains of the mixture of spinel grains and magnesium oxide grains are situated close to one another such that no gaps are present.

8. The substrate of claim 2, wherein the spinel grains and the magnesium oxide grains are at least partially fused together to remove gaps formed therebetween.

9. The substrate of claim 1, wherein the spinel and magnesium oxide comprises:
   a first layer of spinel and magnesium oxide;
   a second layer of spinel and magnesium oxide surrounding the first layer; and
   a third layer of spinel and magnesium oxide surrounding the second layer.

10. A sensor assembly of a resistance thermometer, comprising:
    a substrate formed essentially only of spinel and magnesium oxide; and
    a measuring structure disposed on the substrate, a thermal coefficient of expansion of the substrate is within 10% of thermal coefficient of expansion of the measuring structure.

11. The sensor assembly of claim 10, wherein the measuring structure is formed of platinum.

12. The sensor assembly of claim 10, further comprising a cover layer disposed on the measuring structure.

13. A resistance thermometer, comprising:
    a sensor assembly having a substrate formed essentially only of spinel and magnesium oxide and a measuring structure disposed on the substrate, a thermal coefficient of expansion of the substrate is within 10% of thermal coefficient of expansion of the measuring structure.

14. The resistance thermometer of claim 13, wherein the measuring structure is formed of platinum.

15. A method for producing a substrate for a sensor assembly of a resistance thermometer, comprising:
    combining essentially of spinel and magnesium oxide.

16. The method of claim 15, wherein, in the combining step, the spinel and magnesium oxide are mixed in a powder form.

17. The method of claim 16, further comprising a step of forming the mixture into a substrate body and then heating the substrate body.

18. The method of claim 16, further comprising the steps of:
    mixing a solvent with the spinel powder and the magnesium oxide powder; and heating the resulting mixture to evaporate the solvent to form the substrate consisting essentially only of spinel and magnesium oxide.

19. The method of claim 15, wherein the step of combining spinel and magnesium oxide comprises mixing spinel grains with magnesium oxide grains, wherein the method further comprises the step of compacting the mixture of spinel grains and magnesium oxide grains to remove gaps formed therebetween.

20. The method of claim 15, wherein the step of combining spinel and magnesium oxide comprises mixing spinel grains with magnesium oxide grains, wherein the method further comprises the step of at least partially fusing the spinel grains and the magnesium oxide grains to remove gaps formed therebetween.

21. The method of claim 15, wherein, in the combining step, the spinel and magnesium oxide are mixed in a paste form, the method further comprising the steps of:
    forming a first layer of spinel and magnesium oxide paste;
    depositing a second layer of spinel and magnesium oxide paste onto the first layer;
    removing a portion of the second layer with a tool moving in a direction parallel to a plane defined by the first layer;
    heating the second layer; and after the step of heating the second layer, depositing a third layer of spinel and magnesium paste onto the second layer.

22. The method of claim 15, further comprising the steps of:

forming a first layer of spinel and magnesium oxide;

submerging the first layer into a solution of spinel and magnesium oxide for forming a second layer of spinel and magnesium oxide surrounding the first layer;

removing the submerged first layer and second layer from the solution at a uniform speed;

heating the second layer; and submerging the first layer and the second layer into the solution of spinel and magnesium for forming a third layer of spinel and magnesium oxide surrounding the second layer.

\* \* \* \* \*